July 13, 1965 P. A. G. LEPELLETIER 3,194,019
MASTER CYLINDER FOR HYDRAULIC BRAKES
Filed March 18, 1964 9 Sheets-Sheet 7

INVENTOR
PIERRE A. G. LEPELLETIER
By Irwin J. Thompson
ATTY.

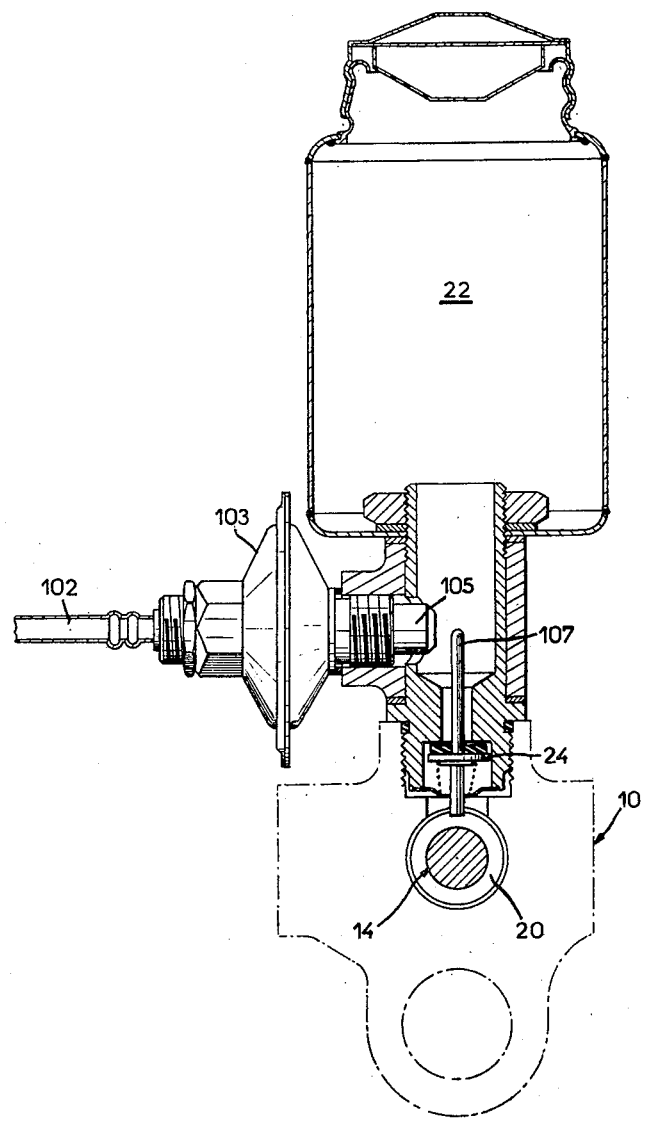

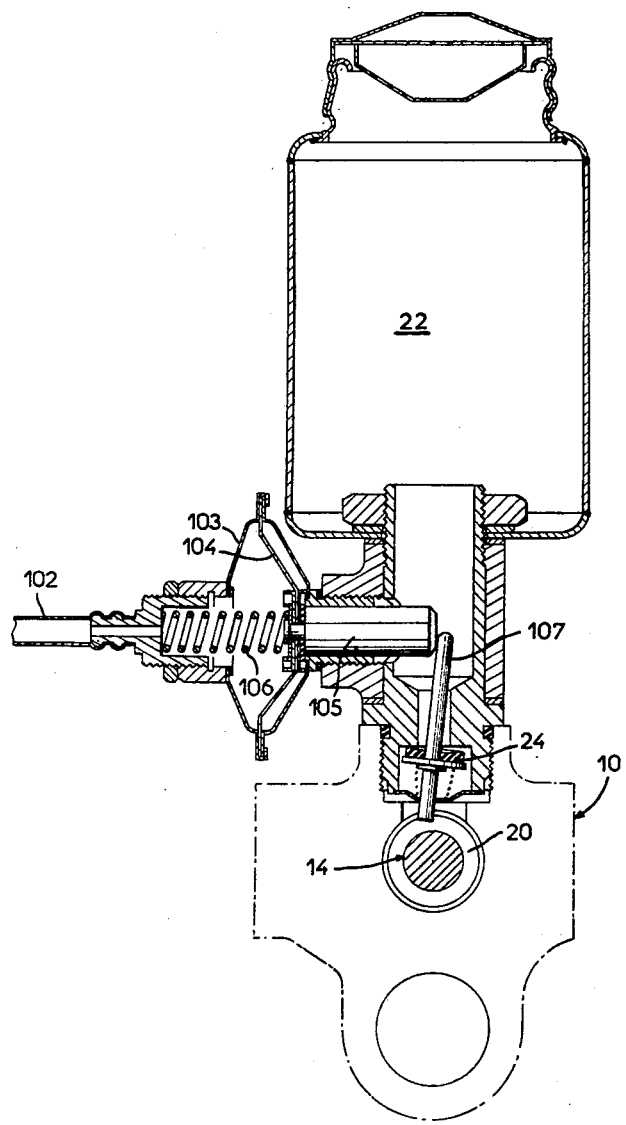

United States Patent Office 3,194,019
Patented July 13, 1965

3,194,019
MASTER CYLINDER FOR HYDRAULIC BRAKES
Pierre André Georges Lepelletier, Chatou, France, assignor to Societe Anonyme Francaise du Ferodo, Paris, France, a corporation of France
Filed Mar. 18, 1964, Ser. No. 352,920
Claims priority, application France, Mar. 26, 1963, 929,236
7 Claims. (Cl. 60—54.6)

The present invention relates to a master cylinder for hydraulic brakes of the type comprising a piston unit which defines, on the one hand two primary chambers which, during the inward movement of the piston unit for braking, drive equal or proportional volumes into two primary conduits leading respectively to two brakes, and on the other hand a secondary chamber which is coupled to a secondary circuit balancing the reactions of the said two brakes. The invention relates more particularly to such a master cylinder of the kind described in U.S. Patent No. 3,044,581.

The present invention has for its object a master cylinder of the kind above referred to, in which the secondary chamber reduces in volume during the inward travel of the piston unit and which is especially characterized by means for selectively controlling the pressure in the secondary chamber of the master cylinder with the object of avoiding excessive effort in the operation of depression of the piston unit. By virtue of this arrangement, after a phase of approach to contact of the braking members, which is very effective, a continued depression of the pedal does not however require an excessive effort, since the pressure in the secondary chamber is reduced by the above-mentioned control means.

In one form of construction, a one-way valve is provided between the secondary chamber of the master cylinder and the secondary braking circuit so as to isolate the said chamber from the said circuit when the pressure in the said circuit tends to exceed the pressure in the said chamber, while the said means for controlling the pressure maintain the pressure in the said chamber at a lower value than the pressure in the said circuit after closure of the said one-way valve.

The said pressure control means may be means for annulling the pressure in the secondary chamber of the master cylinder and preferably comprise a valve interposed between the secondary chamber of the master cylinder and a reservoir, and controlled by the pressure in the secondary braking circuit, so that the said valve opens when the pressure in the secondary circuit sufficiently exceeds the pressure in the secondary chamber. In an alternative form, the pressure control means comprise a differential piston interposed between the secondary chamber and the secondary circuit, and introducing a step-down ratio between the pressures in the said chamber and the said circuit.

In another alternative form, in which the downward movement of the piston unit is effected with the aid of an assistance device, the pressure control means comprise a passage between the secondary chamber and a reservoir, a valve in the said passage to close or open the passage, and a control for the said valve actuated in dependence on a condition of operation of the said assistance device so as to close the said passage when the said assistance device is working normally and to open the said passage when the said assistance device is defective.

Further objects, particular features and advantages of the invention will also be brought out in the description which follows below of forms of construction selected by way of example, reference being made to the accompanying drawings, in which:

FIG. 8 is a view in transverse section of still another alternative form of master cylinder;

FIG. 9 is similar to FIG. 8, but in which the working position is modified.

Figure 1:
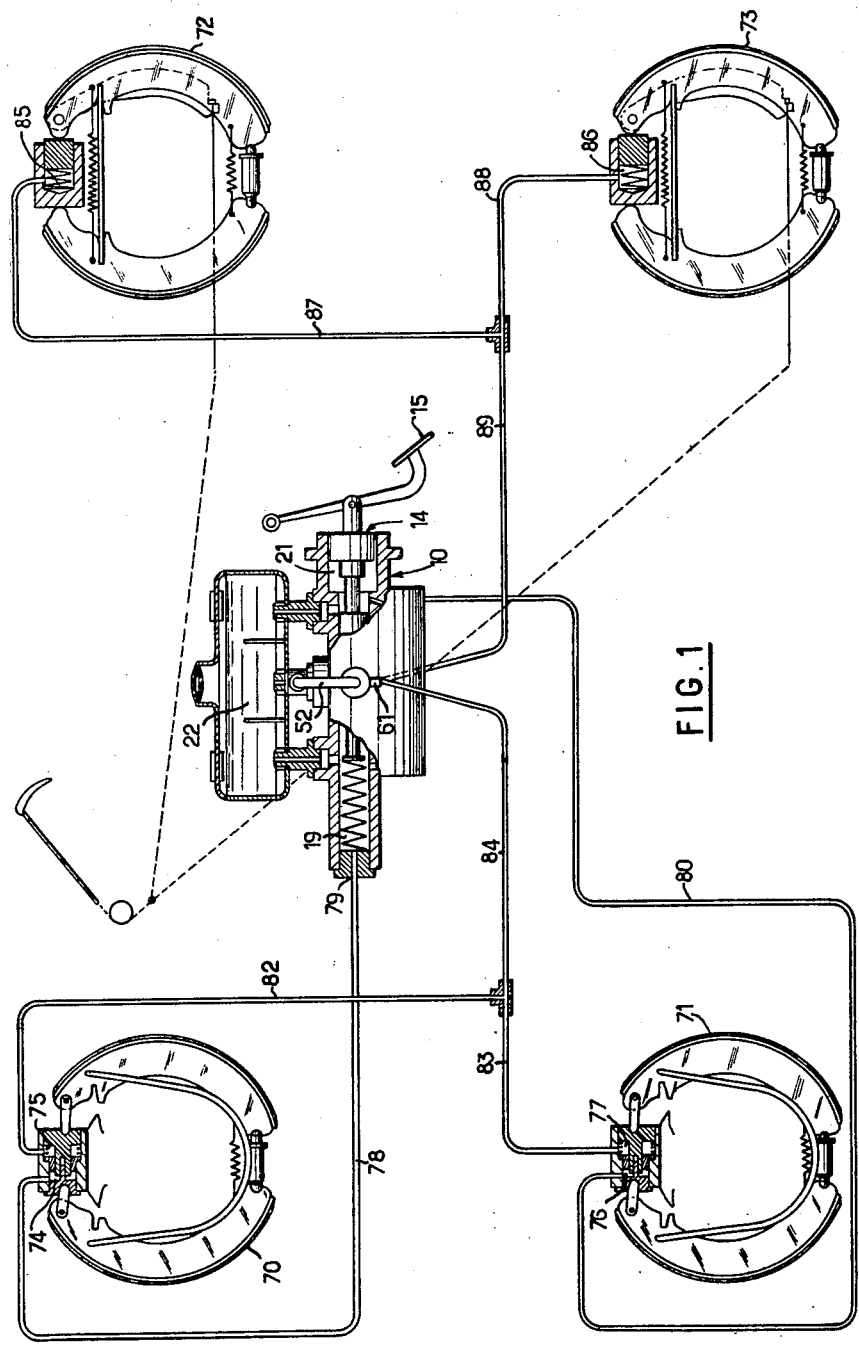
FIG. 1 is a diagram of a braking installation for an automobile vehicle comprising a master cylinder according to the invention.

In the form of embodiment shown in FIGS. 1 to 4, the master cylinder 10 of the braking installation of the vehicle comprises three cylindrical drilled holes in line (FIG. 2); a front hole 11, an intermediate hole 12 and a rear hole 13, of increasing diameters. The fluid of the installation is substantially incompressible, such as oil.

In the drilled holes 11, 12 and 13 is mounted a sliding unit 14 actuated by the brake pedal 15. The unit 14 comprises a piston 16 operating in the bore 11, a piston 17 operating in the bore 12 and a piston 18 operating in the bore 13. In front of the front piston is formed a primary chamber 19. Between the pistons 16 and 17 is formed a secondary chamber 20. Between the pistons 17 and 18 is formed another primary chamber 21. The chambers 19, 20 and 21 are connected to a tank 22 respectively by valves 23, 24 and 25 which can be rocked by the unit 14. A spring 26 holds the unit 14 in the position of rest (FIG. 2) in which the valves 23, 24 and 25 are half-open.

The master cylinder 10 is arranged in such manner that when the unit 14 is depressed by the action of the pedal 15, first of all the valves 23, 24 and 25 are permitted to close, and immediately after, equal volumes are driven into the primary chambers 19 and 21, while an additional volume is expelled by the secondary chamber 20.

Below the bores 11, 12 and 13, the master cylinder 10 is provided (FIG. 2) with three other bores in line: a front bore 27, an intermediate bore 28 and a rear bore 29. The bores 27 and 29 have the same diameter while the bore 28 has a larger diameter. In the bore 27 is engaged a tail 30 of a piston, the head 31 of which is engaged in the bore 28. In the bore 29 is engaged a tail 32 of a piston, the head 33 of which is engaged in the bore 28.

The tail 30 forms in the bore 27 a chamber 34 communicating at 35 with the chamber 19. The tail 32 forms in the bore 29 a chamber 36 communicating at 37 with the chamber 21. The heads 31 and 33 form a chamber 38 in the bore 28. A spring 39 is interposed between the heads 31 and 33 and tends to apply these heads in abutment at 40 and 41 against the shoulders which separate the bore 28 from the bores 27 and 29.

Figure 4:
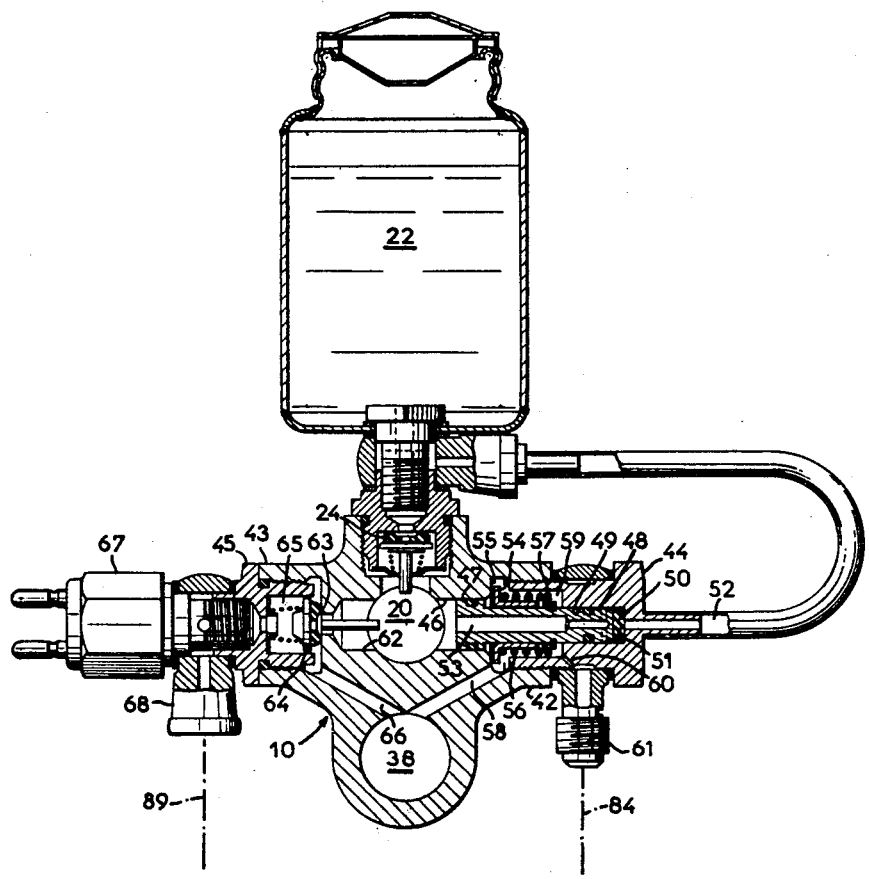
FIG. 4 is a view of the master cylinder in transverse section taken along the line IV—IV of FIG. 2.

Reference will now be made more particularly to FIG. 4 in which the chambers 38 and 20 are shown one below the other. The master cylinder 10 is provided laterally and in a symmetrical manner with two threaded end portions 42 and 43 which are arranged at the level of the chamber 20, and on which are screwed respectively the threaded plugs 44 and 45.

The end piece 42 has a bore 46 which communicates with the chamber 20, and in which slides a piston 47 having a tail 48 of smaller diameter. This tail 48 slides in a bore 49 drilled in the plug 44. The extremity of the tail 48 forms a valve 50 which co-operates with a a seating 51 surrounding a conduit 52 directly coupled to the tank 22.

A passage 53 is formed inside the piston 47 and in its tail 48 and is shaped in such manner that, when the valve 50 is displaced from the seating 51, it causes the chamber 20 to communicate with the conduit 52, that is to say with the tank 22.

A ring 54 is slidably engaged round the tail 48 and co-operates in application against a fixed abutment 55. A spring 56 is interposed between the ring 54 and a washer 57 rigidly fixed to the tail 48, and tends to close the valve 50 and to apply the ring 54 against the abutment 55.

The chamber 38 communicates through a passage 58 with the space 59 which is inside the plug 44 and which surrounds the tail 48. This space 59 communicates by a small calibrated orifice 60 with a coupling 61.

The end piece 43 has a drilled bore 62 which communicates with the chamber 20 and which forms a seating 63 for a rockable valve 64 intended to be half-opened at rest by the piston 16, in the same way as the valve 24, and to be re-closed as soon as the unit 14 begins to be depressed by the action of the pedal 15.

When it is half-open, the valve 64 provides a communication between the chamber 20 and a chamber 65 which is connected by a passage 66 to the chamber 38. The chamber 65 controls a stop-lamp switch 67 and is connected to a coupling 68.

Reference will now be made more particularly to FIG. 1, in which there are seen at 70 and 71 the two front brakes of the vehicle and at 72 and 73 the two rear brakes.

Figure 2:
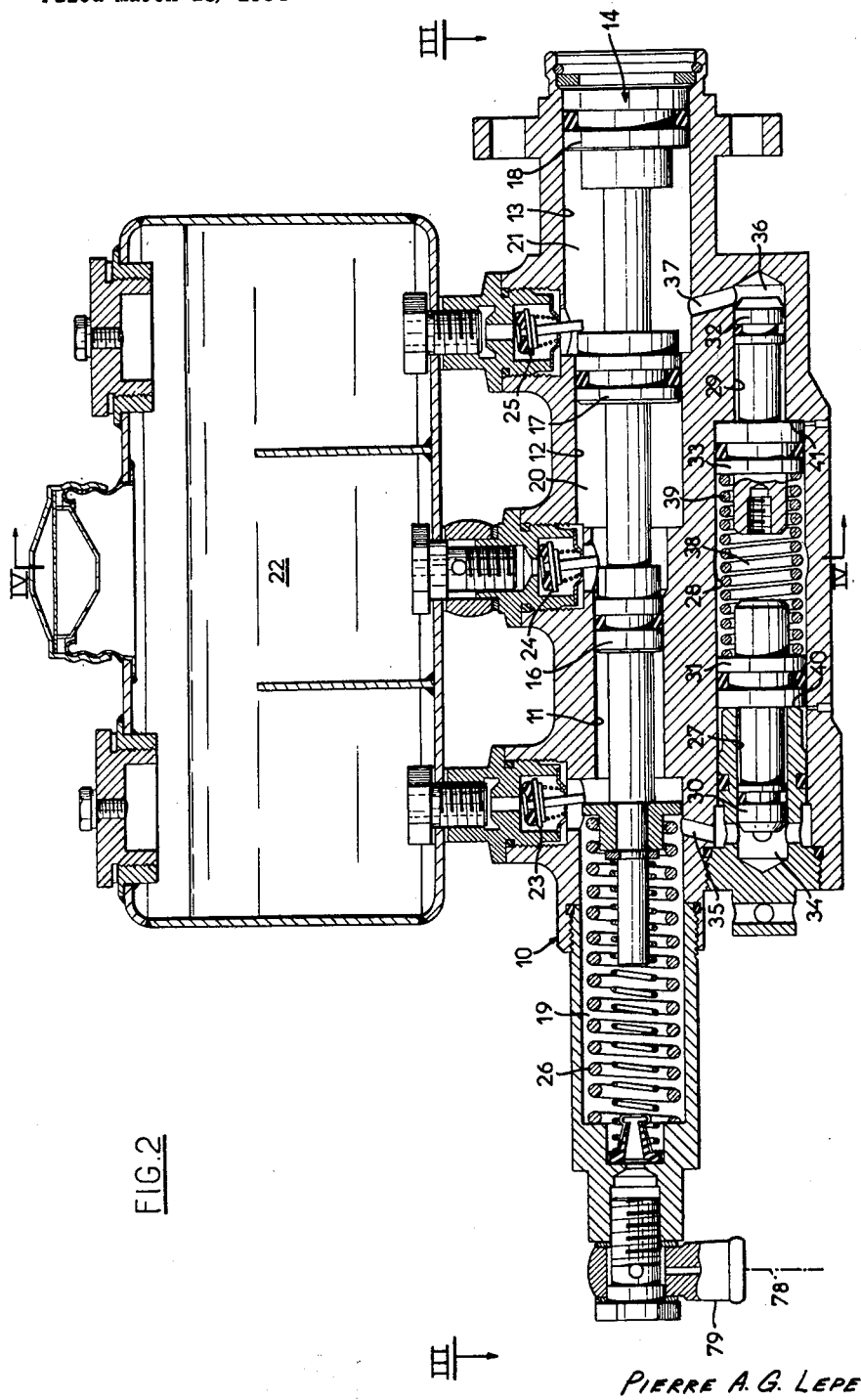
FIG. 2 is a view in longitudinal section of this master cylinder.
Figure 3:
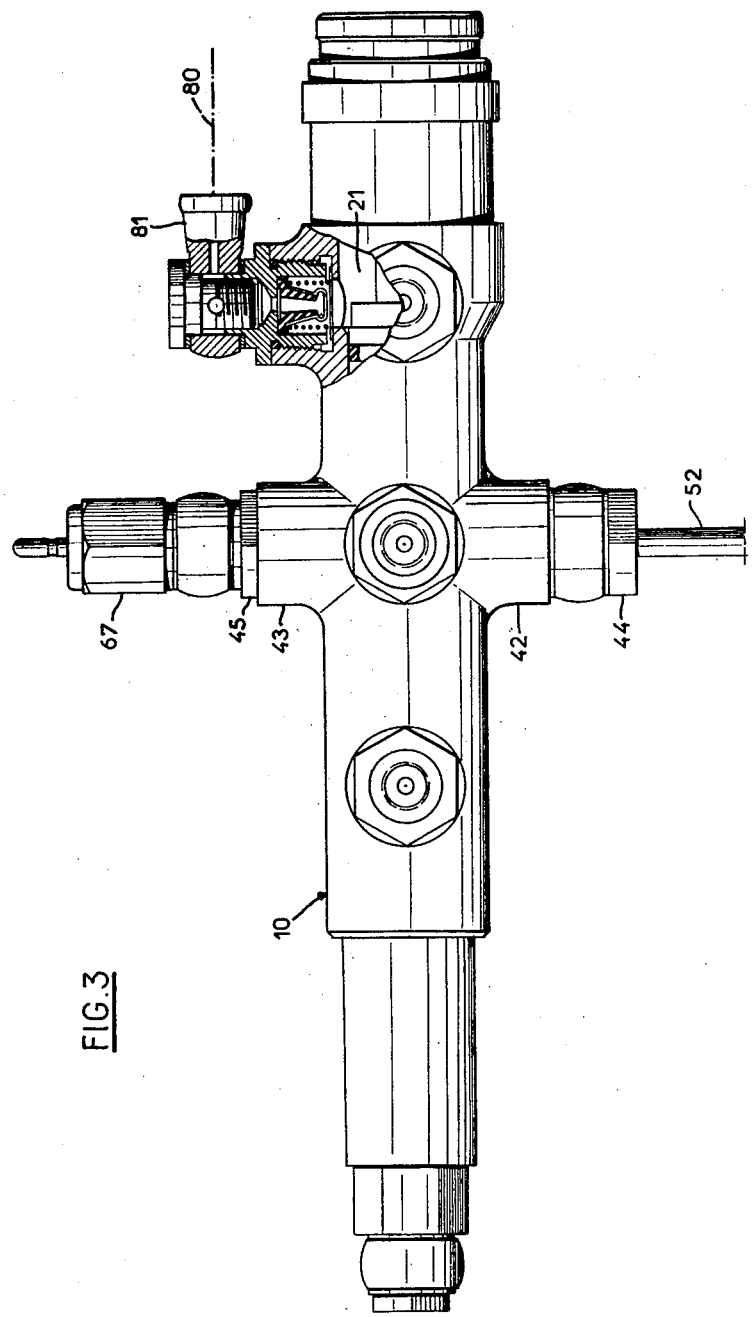
FIG. 3 is a view in plan of the master cylinder, taken along the arrows III—III of FIG. 2.

The front brakes 70 and 71 comprise respectively double cylinders 74, 75 and 76, 77, that is to say with a double supply, the primary cylinder 74 of the brake 70 is connected by a primary conduit 78 to a coupling 79 of the chamber 19 (FIGS. 1 and 2). The primary cylinder 76 of the brake 71 is connected by a primary conduit 80 to a coupling 81 of the chamber 21 (FIGS. 1 and 3). The secondary cylinders 75 and 77 of the brakes 70 and 71 are connected by conduits 82 and 83 to a single conduit 84, which is connected to the coupling 61 (FIGS. 1 and 4).

The rear brakes 72 and 73 comprise respectively single cylinders 85 and 86, that is to say with a single supply. The cylinders 85 and 86 are connected by the conduits 87 and 88 to a single conduit 89 which is connected to the coupling 68 (FIGS. 1 and 4).

When the pedal 15 is depressed, the unit 14 is moved towards the left of FIG. 2, which first of all frees the four rocking valves 23, 24, 25 (FIG. 2) and 64 (FIG. 4), which close. From this moment and simultaneously, the chambers 19 and 21 deliver respectively through the primary conduits 78 and 80 equal volumes into the cylinders 74 and 76 of the front brakes 70 and 71, while the additional volume expelled from the chamber 20 lifts the valve 64 and then passes to the cylinders 85 and 86 of the rear brakes 72 and 73 through the coupling 68 and the conduits 89, 87 and 88, and to the cylinders 75 and 77 of the front brakes 70 and 71 over the path 66–38–58–60–61–84 and 82 and 83. The small calibrated section of the passage 60 assists the flow of secondary oil to the rear brakes 72 and 73 rather than to the front brakes 70 and 71. The valve 50 is held on its seating 51 by the spring 56.

This first part of the operation permits a very rapid approach of the jaws towards the brake drums, while the secondary circuits 82, 83, 84 and 89, 87, 88 are put slightly under pressure.

After the establishment of contact in the front brakes 70 and 71, the secondary pressure begins to rise rapidly at 82, 83 and 84 in response to the primary pressures, and passes up through 61, 60, 58, 38 and 66, which closes the valve 64 which then isolates the chamber 20. Simultaneously, this rising pressure acts on the differential piston 47 and causes it to move over a limited travel towards the left of FIG. 4, which opens the valve 50 and puts the chamber 20 into connection with the tank 22 through the conduit 52. By this means, the high pressure is prevented from causing a resistance to the pedal 15 and does not give rise to any undue effort in order to accentuate the braking.

The high pressure which exists in the secondary chamber 82–83–84–61–60–58–38–66–65–68–89–87–88, and which is maintained by the reaction on the front brakes 70 and 71, while being modulated by the force at the pedal 15, ensures the braking on the four brakes 70, 71, 72 and 73. This braking is balanced because it is the same high pressure which acts.

It should be observed that the high pressure acting in the chamber 38 (FIG. 2) forcibly applies the pistons 31 and 33 against the fixed abutments 40 and 41, so that the primary pressures in the chambers 34 and 36 may have values different from each other, and as these pressures are those of the primary chambers 34–35–19–78–74–36–37–21–80–76, the independence of such primary pressures lends itself without stress to effective balancing by the preponderant secondary pressure at 82–83–84.

In the event of a rupture of the secondary circuit as well as during the course of braking in reverse gear, the pressure remains low in the chamber 38 and the two pistons 31 and 33 come closer together or eventually into mutual contact under the action of the primary pressures at 34 and 36. By virtue of this compensation, these primary pressures are made equal, which ensures an acceptable balancing for these cases of operation.

If the brake pedal 15 is depressed several times in succession without fully lifting the foot, for example with the vehicle stopped or in reverse gear, the unit 14 acts with the valves 24 and 64 as a suction and delivery pump, and it might be feared that the pressure in the secondary chamber increases to such an extent that the driver might lose control. However, such operation is limited solely to taking-up play since, as soon as the secondary pressure reaches the calibration setting of the spring 56 (FIG. 4) the piston 47 moves towards the left, which opens the valve 50 and the chamber 20 is connected to the tank 22. The valve 64 remains henceforth closed and the oil taken from the tank 22 by the unit 14 returns to it by the conduit 52. By the action of the closed valve 64 and the pistons 31 and 33, the driver thus retains full control of the pressure in the secondary circuit, without anything occurring to interfere with the return to rest when the brake pedal is released, the return of the unit 14 under the action of the spring 26 being effected with sufficient force to overcome the resistance which may be offered by the tail of the valve 54 applied against its seating according to the calibration value of the secondary pressure given by the spring 56.

Figure 5:
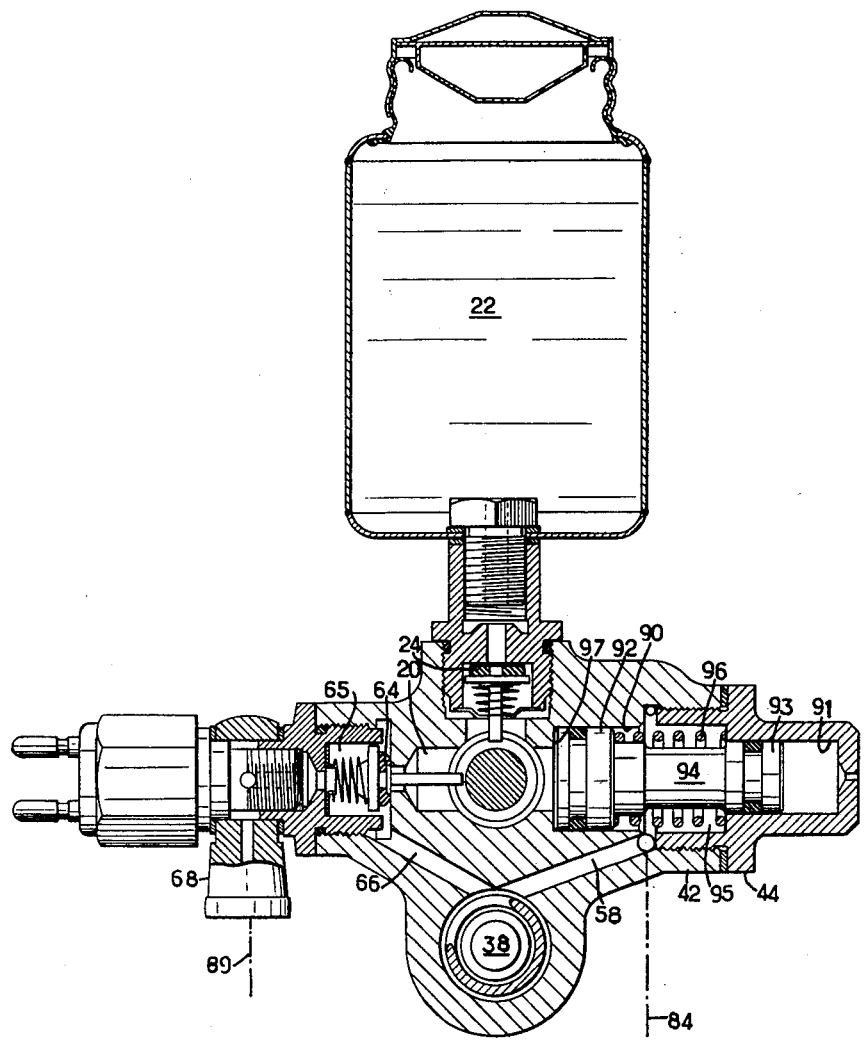
FIG. 5 is a view similar to FIG. 4, but relating to an alternative form of the master cylinder.

Reference will now be made to FIG. 5 in which the arrangement is similar to that which has just been described with reference to FIGS. 1 to 4, but in which the means which control the pressure in the secondary chamber 20, instead of annulling that pressure above a predetermined threshold value, attenuate the said pressure by means of a stepping-down of pressure between the secondary circuit and the chamber 20.

To this end, the master cylinder 10 is provided, in the lateral boss 42 and the plug 44, instead of the device previously described, with two bores in line: a bore 90 of large diameter and a bore 91 of smaller diameter. In the bores 90 and 91 is mounted a differential piston comprising a large diameter piston 92 engaged in the bore 91, and a rod 94 connecting together the pistons 92 and 93. The front of the piston 92 is contiguous to the chamber 20, while another chamber 95 is formed between the pistons 92 and 93. A spring 96, acting on the piston 92 tends to maintain the latter in a position in which it is applied against an abutment 97.

The chamber 95 communicates with the conduit 84 of the secondary circuit of the front brakes and through the conduits 58 and 66, with the conduit 89 of the rear brakes.

When the brake pedal is depressed, the unit 14 moves towards the left of FIG. 1, which frees the four valves 23, 24, 25 and 64. The chambers 19 and 21 respectively deliver equal volumes into the two front brakes, while the volume expelled from the chamber 20 lifts the valve 64, the piston 92 being first held fixed against the abutment 97 by the spring 96. The volume of oil which thus passes into the chamber 65 is directed on the one hand towards the front brakes over the path 66-38-58-84, and on the other hand towards the rear brakes through the conduit 89.

This first part of the operation permits of a very rapid approach of the braking members in the various brakes.

After the establishment of contact in the front brakes, the secondary pressure increases rapidly in the circuit 84, 58, 66, 65, 89. The braking is thereby increased in the rear brakes. The valve 64 closes.

As the pedal continues to be depressed, oil is delivered through the primary chambers 19 and 21, which increases the braking in the front brakes and, through the intermediary of the high-pressure secondary at 84, 89, the braking in the rear brakes is also increased. Oil is also driven through the secondary chamber 20 and instead of lifting the valve 64, pushes back the piston 92 towards the right-hand side of FIG. 5. The result is that the chamber 95 is reduced in volume and oil is delivered from the chamber 95, both towards the secondary side of the front brakes through the conduit 84 and to the rear brakes over the path 58-38-66-65-89.

It will be noted that the effort on the pedal will however be brought down to a reasonable value because of the step-down effect provided by the differential piston 92, 93. As a whole, the braking efficiency is good and braking has an excellent fidelity.

Figure 6:
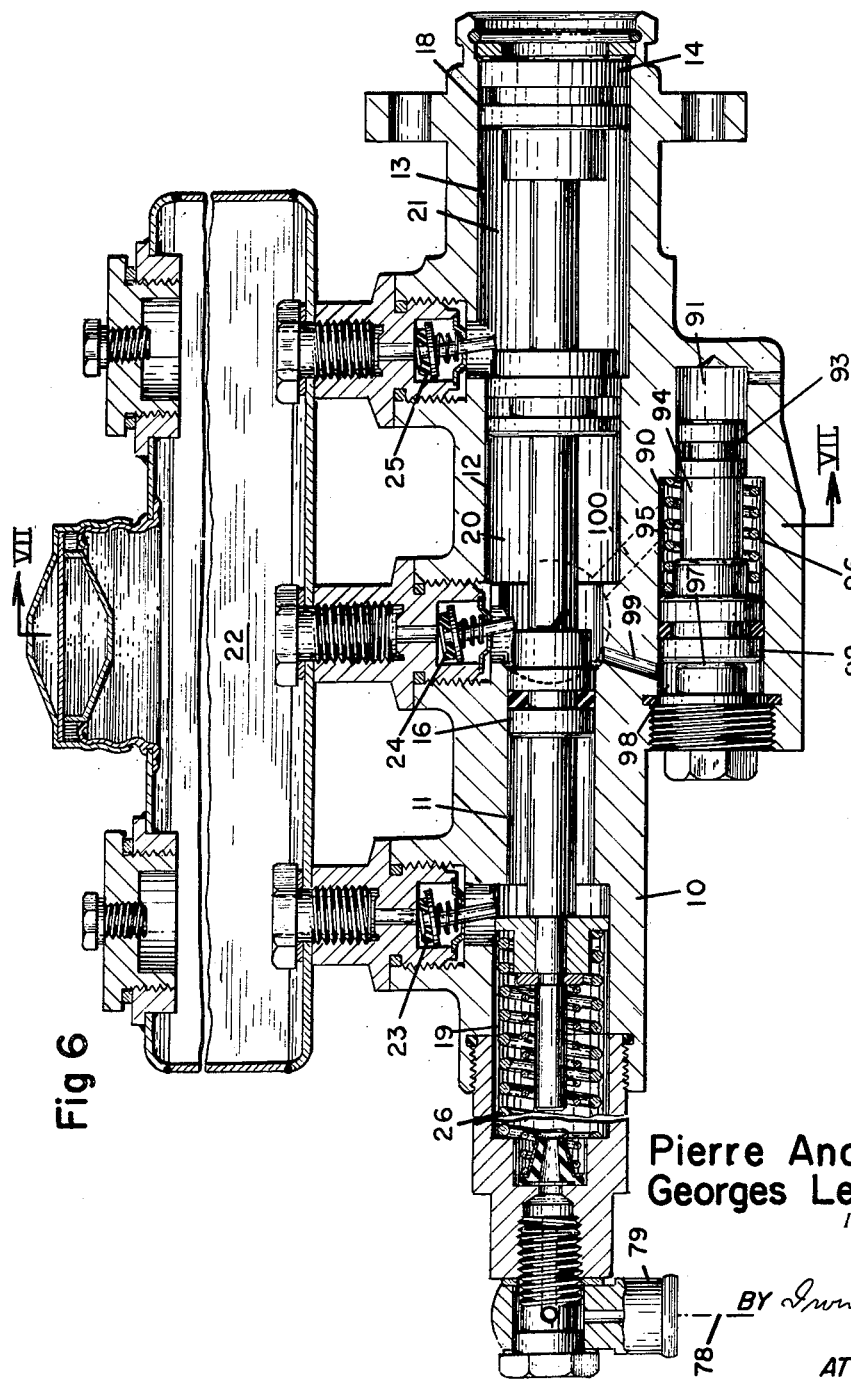
FIG. 6 is a view in longitudinal section of a further alternative form of master cylinder.
Figure 7:
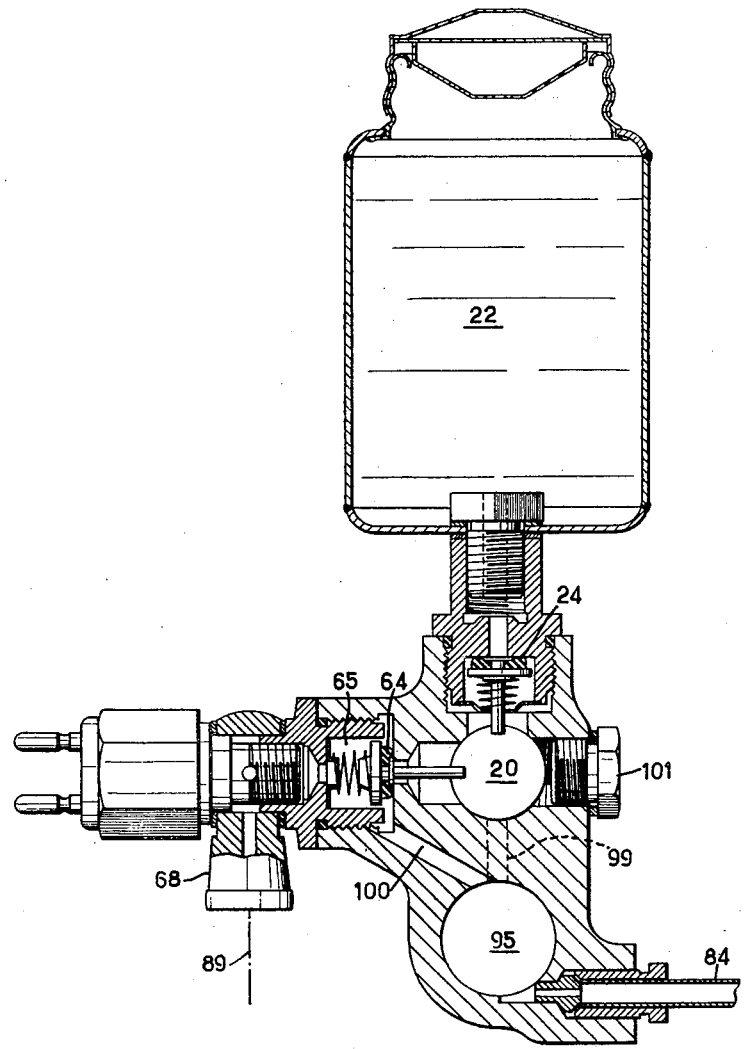
FIG. 7 is a view of this other alternative form in transverse section, taken along the broken line VII—VII of FIG. 6.

Reference will now be made to FIGS. 6 and 7, in which the arrangement is similar to that which has just been described with reference to FIG. 5, but in which the differential piston 92, 93 is arranged below the master cylinder 10 and takes the place of the safety system 34, 31, 38, 33, this latter being eliminated. The front of the piston 92 is contiguous with a chamber 98 communicating by a passage 99 with the chamber 20, while the chamber 95 communicates by a passage 100 with the chamber 65.

The operation is similar to that which has been described with reference to FIG. 5. It will be noted that the outgoing circuit 89 to the rear brakes could, as an alternative form, be obtained by the coupling shown at 101 in FIG. 7, instead of the coupling 68.

Reference will now be made to FIGS. 8 and 9, which relate to the case of a master cylinder 10, the chamber 20 of which is substantially reduced in volume during the depression of the unit 14, and in which the effort at the brake pedal would be too high and would require the use of an assistance device, for example a depression servo-brake. According to the invention, means are provided to permit of an emergency braking in the event of the servo-brake becoming defective and thus making the effort at the pedal prohibitive. These means consist in causing the secondary chamber 20 to communicate with the tank 22 when a depression piping system 102 of the servo-brake is no longer under vacuum but is at atmospheric pressure as a result of a failure.

A depression capsule 103 (FIG. 9) is connected to the pipe 102 and comprises a diaphragm 104 coupled to a piston 105 and controlled by a spring 106. The piston 105 co-operates in abutment with a rod 107 which extends the rocking valve 24 interposed between the secondary chamber 20 and the tank 22.

In normal operation, when the pipe 102 is put under depression, the piston 105 is moved towards the left of FIG. 9 and takes up the position shown in FIG. 8 at which it frees the valve 24, which remains solely under the control of the unit 14 as in the normal circuit.

If there is a fault on the servo-brake by failure of depression, the piston occupies the position shown in FIG. 9 and prevents the valve 24 from closing, even when the unit 14 is depressed. The secondary chamber 20 is thus put into communication with the tank 22, so that the primary circuits are alone operative. The effort at the pedal is acceptable and there is obtained an emergency braking with the front brakes alone.

What I claim is:

1. A master cylinder for hydraulic brakes of the kind comprising a piston unit which forms on the one hand two primary chambers which drive equal or proportional volumes into two primary conduits leading respectively to two brakes, when the piston unit is depressed in the action of braking, and on the other hand a secondary chamber which is connected to a secondary circuit balancing the reactions of said two brakes, said secondary chamber being reduced in volume by the depression of said piston unit, and further comprising means for selectively controlling the pressure in the secondary chamber of said master cylinder in order to avoid an excessive effort in the operation of depression of said piston unit.

2. A master cylinder as claimed in claim 1, in which a one-way valve is provided between the secondary chamber of said master cylinder and the secondary braking circuit so as to isolate said chamber from said circuit when the pressure in said circuit tends to exceed the pressure in said chamber, and in which said pressure control means maintain the pressure in said chamber at a lower value than the pressure in said circuit after closure of said one-way valve.

3. A master cylinder as claimed in claim 2, in which said pressure control means are means to exhaust the pressure in the secondary chamber of said master cylinder.

4. A master cylinder as claimed in claim 3, in which said pressure exhausting means comprise a valve interposed between the secondary chamber of said master cylinder and a tank and controlled by the pressure in the secondary braking circuit, whereby said valve opens when the pressure in said secondary circuit sufficiently exceeds the pressure in said secondary chamber.

5. A master cylinder as claimed in claim 2, in which said pressure control means comprise a differential piston interposed between the secondary chamber and the secondary circuit, and introducing a step-down ratio between the pressures in said chamber and said circuit.

6. A master cylinder as claimed in claim 5, in which a spring tends to restore the said differential piston into an abutment position.

7. A master cylinder as claimed in claim 1, in which the depression of said piston unit is effected by means of an assistance device, in which said pressure control means comprise a passage between the secondary chamber and a tank, a valve in this passage to close or open said passage, and a control for said valve actuated in dependence on pressure in said assistance device, in such manner as to close said passage when said assistance device functions normally and to open said passage when said assistance device is defective.

References Cited by the Examiner

UNITED STATES PATENTS

| | | | |
|---|---|---|---|
| 2,385,812 | 10/45 | Hoyt | 188—152.04 |
| 2,674,352 | 4/54 | Braun | 60—54.6 X |
| 3,044,581 | 7/62 | Lepelletier | 60—54.6 X |
| 3,088,285 | 5/63 | Giacosa et al. | 60—54.6 |

JULIUS E. WEST, *Primary Examiner*.